Nov. 1, 1966 A. J. WILLIAMS, JR., ET AL 3,283,237
PHOTOELECTRIC MODULATOR WITH TRANSPARENT
ELECTROSTATIC SHIELDS
Filed May 20, 1963 2 Sheets-Sheet 1

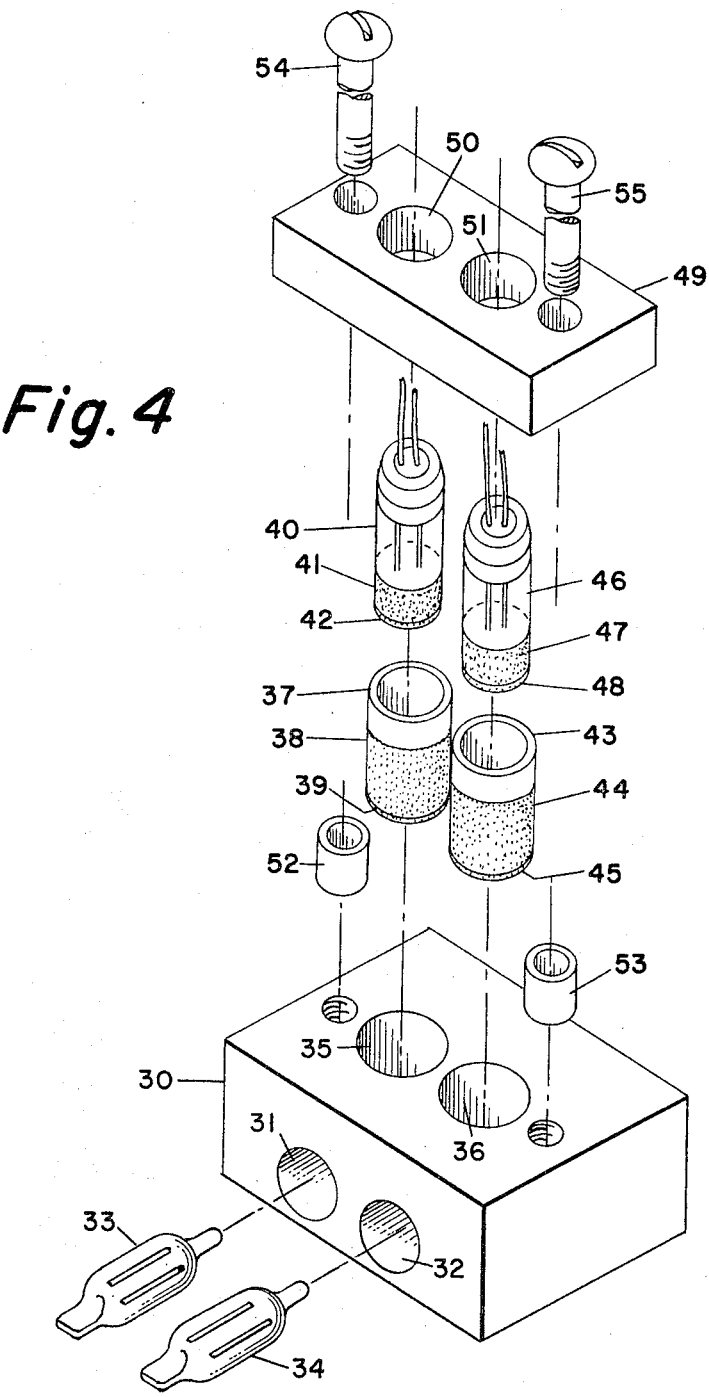

3,283,237
PHOTOELECTRIC MODULATOR WITH TRANSPARENT ELECTROSTATIC SHIELDS
Albert J. Williams, Jr., Philadelphia, and Norman E. Polster, Southampton, Pa., assignor to Leeds and Northrup Company, Philadelphia, Pa., a corporation of Pennsylvania
Filed May 20, 1963, Ser. No. 281,616
9 Claims. (Cl. 321—34)

This invention relates to photoelectric modulators and, more particularly, to a photoelectric modulator having a light transparent, electrically conductive shield for isolating the low level input circuit of the modulator from extraneous voltages.

Modulators utilizing photoelectric devices are commonly used to convert a low level D.C. input voltage to an A.C. output voltage. The conductivity of the photoelectric devices is controlled by the light emanating from a gaseous discharge device. The gaseous discharge device, or devices, are energized by a source of A.C. voltage to render the gaseous discharge devices alternately energized and the photoelectric devices alternately conducting.

One problem which has been encountered in modulators of this type is that the A.C. energizing voltage for the gaseous discharge tube produces extraneous voltages which adversely affect the D.C. input circuit, the photoelectric devices and the A.C. output circuit. One way to avoid this problem is to space the gaseous discharge devices at a distance from the photoelectric devices so that the extraneous voltages will not adversely affect the photoelectric devices and associated circuitry. However, when this is done, all of the light from the gaseous discharge devices does not fall directly on the photoelectric devices and the efficiency of the system is impaired.

Another way to avoid the extraneous voltage problem is to provide some type of shielding. For example, one prior art solution to the problem provided a wire screen or mesh shield between the gaseous discharge light source and the photoelectric device. The wire screen then provides electrostatic shielding for the photoelectric device while at the same time allowing light from the light source to fall on the photoelectric device. The use of a wire screen for a shield is not satisfactory under all conditions. The wire screen cuts off some of the light from the photoelectric device and does not, in general, provide good shielding for the amount of light which passes through the screen.

The above, and other disadvantages of the prior art are obviated in accordance with our invention by providing a shield constructed of a light transparent, electrically conductive material. This material provides very good electrical shielding and permits a large amount of light to pass from the light source to the photoelectric device.

The light transparent, electrically conductive shield may take the form of a transparent disc having a coating of light transparent, electrically conductive material thereon, or may take the form of a light transparent, electrically conductive coating directly on the envelope of the photocell. One example of a light transparent, electrically conductive material which may be used for this purpose is tin oxide, although there are other materials which can be suitably used. For example, a very thin film of gold is light transparent and electrically conductive and may be used for shielding in accordance with this invention.

Under certain conditions it is desirable to use a double shield in the modulator. Under these circumstances, a ground shield is provided for the light sources and a guard shield is provided for the photoelectric devices. The ground shield provides electrostatic shielding of the light sources and the A.C. energizing voltage from the guard shield and the guard shield isolates the photocells, the D.C. input and the A.C. output circuitry from the ground shield. When two shields are provided, the use of a light transparent, electrically conductive material provides added advantages over prior art wire screen or mesh shields. When two shields are used, the periodic nature of the opaque-transparent areas of a mesh causes light transmission which is dependent on the position of the mesh of one shield with respect to the mesh of the other shield. This problem does not exist when shields constructed of a light transparent, electrically conductive material are used.

The foregoing and other objects, features and advantages of the invention will be better understood from the following more detailed description in conjunction with the drawings in which:

FIG. 4 shows the structural details of a photoelectric modulator with a double shield.

Figure 1:
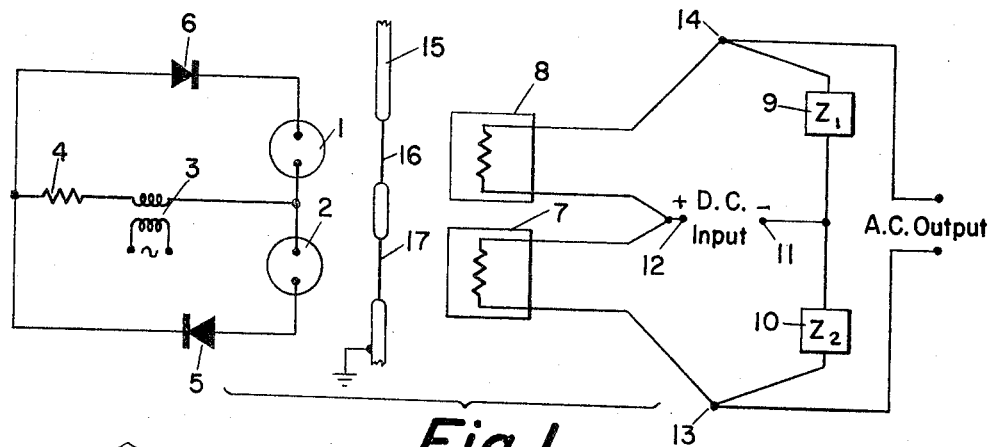
FIG. 1 is a schematic drawing of a photoelectric modulator with a single shield.

Referring now to FIG. 1 there is shown a photoelectric modulator with a single shield. While this invention has applicability to modulators using photoelectric devices of different types, it has particular applicability to modulators using photoconductive cells as will be specifically explained in conjunction with the drawings. The modulator includes gaseous discharge light sources 1 and 2 which may be neon bulbs. These neon bulbs are energized by an A.C. voltage source including the transformer 3. The secondary of transformer 3 is connected to one electrode of each of the neon bulbs 1 and 2 and to a dropping resistor 4. The A.C. voltage is applied through dropping resistor 4 to the diodes 5 and 6. Diodes 5 and 6 apply the energizing voltage to the other electrodes of the neon bulbs 1 and 2 so that the neon bulbs conduct on alternate, opposite, half-cycles of the A.C. energizing voltage.

Light from neon bulbs 1 and 2 is incident upon the photoconductive cells 7 and 8, the light from neon bulb 2 being incident upon photoconductive cell 7 and the light from neon bulb 1 being incident upon photoconductive cell 8. The photoconductive cells 7 and 8 form two arms of a four-arm bridge. Impedances 9 and 10 form the other two arms of the four-arm bridge. The D.C. input voltage is applied between the common junction 11 of the impedances 9 and 10 and the common junction 12 of the photoconductive cells 7 and 8. An A.C. output voltage is generated between the junction 13 of photoconductive cell 7 and impedance 10 and the junction 14 of the photoconductive cell 8 and impedance 9.

The operation of the photoelectric modulator thus far described is as follows. The neon bulbs 1 and 2 are alternately energized and light from these bulbs alternately changes the conductivity of the photoconductive cells 7 and 8. When the neon bulb 1 is energized, light from this bulb renders the photoconductive cell 8 more conductive. Current flows from junction 12 through photoconductive cell 8 and through impedance 9 to the junction 11. The magnitude of this current is dependent upon the magnitude of the D.C. input voltage. Consequently, the magnitude of the half-cycle voltage at the junction 14 is dependent upon the D.C. input voltage. On the next half-cycle, when the neon bulb 2 is energized, light from this bulb is incident upon photoconductive cell 7 and renders the photoconductive cell more conductive. Current flows from junction 12 through photoconductive cell 7 and impedance 10 to the junction 11. The magnitude of this current is dependent upon the magnitude of the D.C. input voltage. Consequently, the half-cycle voltage developed at the junction 13 is dependent upon the D.C. input voltage.

In accordance with our invention, a shield 15 is positioned between the neon bulbs 1, 2 and the photoconductive cells 7, 8. This shield 15 is electrically conducting and is light transparent, at least at the portions 16 and 17. As previously mentioned, the light transparent, electrically conductive portion of the shield may be tin oxide although other materials are suitable for this purpose.

While the shield 15 has been shown as being connected to ground, it will be understood that the shield may be connected to any suitable point in the circuit.

Figure 2:
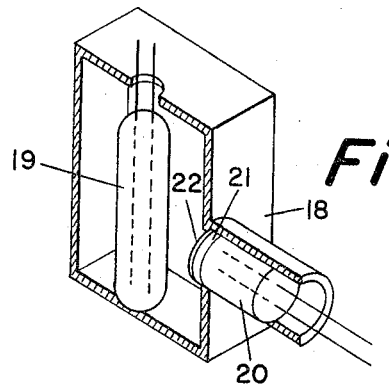
FIG. 2 shows the structural details of the photoelectric modulator with the single shield.

The construction of a photoelectric modulator in accordance with the principles of this invention is shown in FIG. 2. FIG. 2 shows a sectional view of casing 18 which encloses a neon bulb 19 and a photoconductive cell 20 positioned in proximity thereto. In order to shield the photoconductive cell 20 from the neon bulb 19, a transparent disc 21 is provided. The transparent disc 21 is provided with a tin oxide coating 22 on the side of the disc which is adjacent the neon bulb 19. The light transparent, electrically conductive tin oxide coating 22 is positioned in contact with the casing 18 so that there is an electrical connection between casing 18 and coating 22. This coating provides electrostatic shielding between the neon bulb 19 and photoconductive cell 20 while at the same time allowing light from the neon bulb 19 to pass through the disc 21 to the photoconductive cell 20.

Figure 2A:
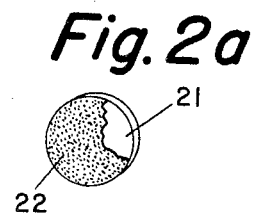
FIG. 2a shows a disc shield having a light transparent, electrically conductive coating thereon.

FIG. 2a shows another view of the transparent disc 21 with the light transparent, electrically conductive coating 22 thereon.

Figure 3:
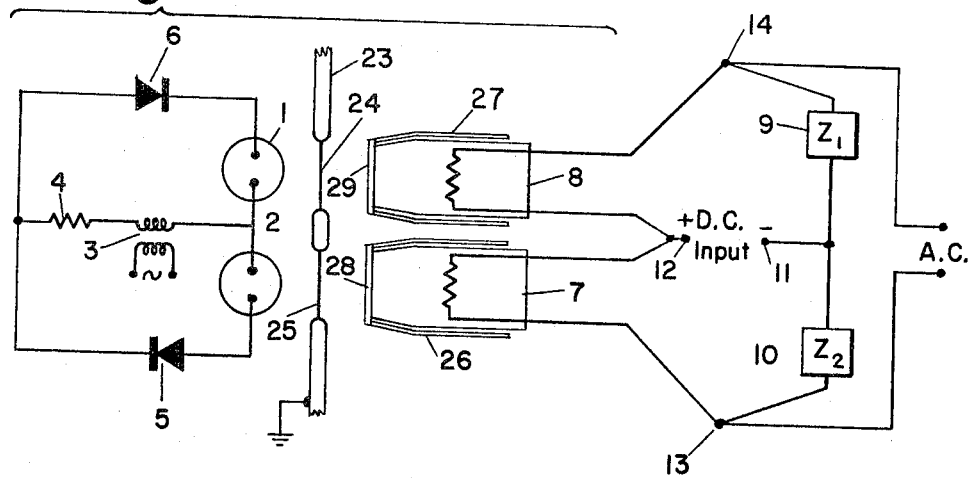
FIG. 3 is a schematic drawing of a photoelectric modulator with a double shield.

FIG. 3 shows a modification of the photoelectric modulator of FIG. 1 wherein like reference numerals denote like elements. In FIG. 3, two shields are provided. A ground shield 23 is provided and is electrically connected to ground potential. Ground shield 23 has light transparent portions 24 and 25 through which light from the neon bulbs 1 and 2 is transmitted to the photoconductive cells 7 and 8. The photo conductive cells 7 and 8 are provided with a guard shield which takes the form of conductive coatings 26 and 27 on the photoconductive cells 7 and 8 respectively. Portions at 28 and 29 of the electrically conductive coatings are light transparent as well as electrically conductive. Light passes through the portions 28 and 29 to the photoconductive cells 7 and 8. The ground shield 23 isolates the neon bulbs 1 and 2 from the photoconductive cells 7 and 8. The guard shields including the coatings 26 and 27 are provided to isolate the photoconductive cells 7 and 8 from the ground shield 23.

The construction of a photoelectric modulator with a double shield is best shown in the exploded view of FIG. 4. The assembly includes a ground block 30 having holes 31 and 32 therein to receive the neon bulbs 33 and 34. Ground block 30 also has holes 35 and 36 in the top thereof which join with the holes 31 and 32 respectively. A ground shield 37 is positioned in the hole 35. The ground shield is constructed of a transparent electrically insulating material and has a conductive coating 38 on the outside thereof. The bottom of ground shield 37 is closed and is covered with a light transparent, electrically conductive coating 39. Ground shield 37 is positioned in the hole 35 with the electrically conductive coating 39 making contact with the ground block 30.

A photoconductive cell 40 is positioned in the ground shield 37. The photoconductive cell 40 has a guard shield which includes the conductive coating 41 and the light transparent, electrically conductive coating 42 on the bottom of the photoconductive cell 40.

A ground shield 43 is provided for positioning in the hole 36 in the ground block 30. Ground shield 43 has an electrically conductive coating 44 on the sides thereof and a light transparent, electrically conductive coating 45 on the bottom thereof. The photoconductive cell 46 is positioned within the ground shield 43. Photoconductive cell 46 has a guard shield including an electrically conductive coating 47 and a light transparent, electrically conductive coating 48 on the bottom of the photoconductive cell 46.

When the photoconductive cell 40 is positioned in the ground shield 37 and the ground shield 37 is positioned in the hole 35, and when the photoconductive cell 46 is positioned in the ground shield 43 which is positioned in the hole 36, then a guard block 49 having holes 50 and 51 therein is positioned over the photoconductive cells 40 and 46. The guard block 49 is electrically insulated from the ground block 30 by means of the insulating spacers 52 and 53. In order to insure that the guard block 49 is completely insulated from ground block 30, the screws 54 and 55 are of an insulating material such as nylon. The guard shield including conductive coating 41 and light transparent, electrically conductive coating 42 on photoconductive cell 40 is electrically connected to the guard block 49. Similarly, the guard shield including the electrically conductive coating 47 and the light transparent, electrically conductive coating 48 on the photoconductive cell 46 is electrically connected to the guard block 49. These connections are most easily made by electrically conductive cement.

The electrically conductive coating 38 on the ground shield 37 is electrically connected to the ground block 30. The electrically conductive coating 44 on ground shield 43 is electrically connected to the ground block 30. Therefore, the ground shielding including coatings 38, 39, 44 and 45 is electrically connected to the ground block 30 but is isolated from the guard shielding including the conductive coatings 41, 42, 47 and 48. The guard shielding is electrically connected to the guard block 49.

The effectiveness of the light transparent, electrically conductive material for shielding is best illustrated by tests which contrast the effectiveness of these shields with wire screen or mesh shields. These tests showed that the voltages from the neon bulbs picked up on the photoconductive cells were attenuated by a factor of 5 when a 70% light transmitting wire mesh was used as a shield. However, when an electrically conductive 70% light transparent glass was used for shielding, the voltages from the neon bulbs picked up on the photoconductive cells were attenuated by a factor of 250 or more. Thus, it can be seen that for the same light conductive, the light transparent, electrically conductive material provides much better shielding than does a wire screen or mesh.

While particular embodiments of the invention have been shown and described, it will, of course, be understood that various changes may be made without departing from the principles of the invention. The appended claims are, therefore, intended to cover any such modifications within the true spirit and scope of the invention.

What is claimed is:

1. A photoelectric modulator comprising a photocell connected between an input circuit and an output circuit, a source of illumination for said photocell, means for periodically energizing said source of illumination, a light transparent electrically conductive electrostatic shield positioned between said source of illumination and said photocell, said shield electrically isolating said input circuit from said energizing means, said light transparent shield transmitting light from said source of illumination to said photocell.

2. The invention recited in claim 1 wherein said photocell has an envelope and wherein said light transparent electrically conductive electrostatic shield is coated on said envelope of said photocell so that said photocell and said source of illumination may be positioned in close proximity to increase the amount of light transmitted from said source of illumination to said photocell.

3. A photoelectric modulator for converting D.C. to A.C., comprising first and second two-terminal photocells, first and second two-terminal bridge arms, a pair of D.C. input terminals, first and second A.C. output terminals, one terminal of each photocell being connected to one of said D.C. input terminals, one terminal of each of said bridge arms being connected to the other of said D.C. input terminals, the other terminal of said first photocell being connected to the first of said A.C. output terminals and to the other terminal of the first of said bridge arms, the other terminal of said second photocell being connected to the second of said A.C. output terminals and to the other terminal of the second of said bridge arms, first and second gaseous discharge light sources, A.C. energizing means for alternately energizing said first and second light sources, means including a light transparent electrically conductive electrostatic shield for coupling light from said first light source to the first of said photocells and for coupling light from said second light source to the second of said photocells, said electrically conductive electrostatic shield electrically isolating said D.C. input circuit from said A.C. energizing means.

4. A photoelectric modulator comprising first and second photocells each having an envelope, a D.C. input circuit and an A.C. output circuit connected to said photocells, each of said photocells having a light transparent electrically conductive coating on a portion of said envelope, electrically conducting guard shield surrounding each of said photocells and electrically connected to said coatings, first and second gaseous discharge light sources, said light sources being respectively positioned in proximity to said coatings on the envelopes of said first and second photocells, an A.C. energizing voltage alternately connected to said light sources so that said light sources are alternately energized, electrically conducting ground shielding intervening between said light sources and said electrically conducting guard shields, portions of said ground shielding adjacent said photocells being light transparent and electrically conducting, said guard shields and said ground shielding being electrically isolated so that said photocells and said D.C. input circuit and said A.C. output circuit are all isolated from the A.C. energizing voltage for said light sources.

5. A photoelectric modulator comprising first and second photocells each having an envelope, a D.C. input circuit and an A.C. output circuit connected to said photocells, a transparent disc having a light transparent electrically conductive coating adjacent each of said photocells, electrically conducting guard shields surrounding each of said photocells and electrically connected to said coatings, first and second gaseous discharge light sources, said light sources being respectively positioned in proximity to said coatings, an A.C. energizing voltage alternately connected to said light sources so that said light sources are alternately energized, electrically conducting ground shielding intervening between said light sources and said electrically conducting guard shields, portions of said ground shielding adjacent said photocells being light transparent and electrically conducting, said guard shields and said ground shielding being electrically separated so that said photocells and said D.C. input circuit and said A.C. output circuit are all prevented from receiving electrical energy from the A.C. energizing voltage for said light sources.

6. A photoelectric modulator comprising:
a photocell connected between an input circuit and an output circuit,
a source of illumination for said photocell,
means for periodically energizing said source of illumination.
a light transparent disc having a light transparent electrically conductive coating, said disc being positioned between said photocell and said energizing means, said electrically conductive coating providing a shield for electrically isolating said input circuit from said energizing means, said light transparent disc and said light transparent coating transmitting light from said source of illumination to said photocell.

7. The invention recited in claim 6 further including a metallic casing enclosing said source of illumination, said photocell and said energizing means, said coating being electrically connected to said casing to provide electrostatic shielding between said photocell and said energizing means.

8. A photoelectric modulator for converting D.C. to A.C. comprising:
first and second two-terminal photocells, said first and said second photocells each having an envelope,
first and second two-terminal bridge arms,
a pair of D.C. input terminals,
first and second A.C. output terminals, one terminal of each photocell being connected to one of said D.C. input terminals, one terminal of each of said bridge arms being connected to the other of said D.C. input terminals, the other terminal of said first photocell being connected to the first of said A.C. output terminals and to the other terminal of the first of said bridge arms, the other terminal of said second photocell being connected to the second of said A.C. output terminals and to the other terminal of the second of said bridge arms,
first and second gaseous discharge light sources,
A.C. energizing means for alternately energizing said first and second light sources,
means including a light transparent electrically conductive electrostatic shield for coupling light from said first light source to the first of said photocells and for coupling light from said second light source to the second of said photocells, said electrostatic shield including a light transparent electrically conductive coating on each of said envelopes, said electrically conductive electrostatic shield electrically isolating said D.C. input circuit from said A.C. energizing means.

9. The photoelectric modulator recited in claim 8 further including first and second ground shields respectively enclosing said first and second photocells, each of said ground shields having electrically conductive light transparent portions for coupling light from said light sources to said photocells, said ground shields being electrically connected to a common reference potential and electrically isolated from said electrostatic shield.

References Cited by the Examiner
UNITED STATES PATENTS

| | | | |
|---|---|---|---|
| 3,117,272 | 1/1964 | Quinn | 321—36 |
| 3,143,655 | 8/1964 | Strandberg | 332—3 |
| 3,153,149 | 10/1964 | Finigan | 250—239 |

JOHN F. COUCH, *Primary Examiner.*

LLOYD McCOLLUM, *Examiner.*

G. GOLDBERG, *Assistant Examiner.*

Disclaimer

3,283,237.—*Albert J. Williams, Jr.*, Philadelphia, and *Norman E. Polster*, Southampton, Pa. PHOTOELECTRIC MODULATOR WITH TRANSPARENT ELECTROSTATIC SHIELDS. Patent dated Nov. 1, 1966. Disclaimer filed Sept. 18, 1969, by the assignee, *Leeds & Northrup Company*.

Hereby enters this disclaimer to claims 1, 2, 3, 6, 7 and 8 of said patent.
[*Official Gazette November 4, 1969.*]